United States Patent
Wang et al.

(10) Patent No.: US 8,102,535 B2
(45) Date of Patent: Jan. 24, 2012

(54) FIBER OPTIC GYROSCOPE USING A LOW-POLARIZATION AND POLARIZATION-MAINTAINING HYBRID LIGHT PATH

(75) Inventors: Wei Wang, Beijing (CN); Qingsheng Yang, Beijing (CN); Zhixin Zhang, Beijing (CN); Yuxin Xu, Beijing (CN); Weiliang Qin, Beijing (CN)

(73) Assignee: Beijing Aerospace Times Optical-Electric Technology Co., Ltd., Beijing (CN)

( * ) Notice: Subject to any disclaimer, the term of this patent is extended or adjusted under 35 U.S.C. 154(b) by 203 days.

(21) Appl. No.: 12/093,301

(22) PCT Filed: May 21, 2007

(86) PCT No.: PCT/CN2007/070035
§ 371 (c)(1),
(2), (4) Date: May 9, 2008

(87) PCT Pub. No.: WO2008/080307
PCT Pub. Date: Jul. 10, 2008

(65) Prior Publication Data
US 2010/0238450 A1    Sep. 23, 2010

(30) Foreign Application Priority Data

Dec. 31, 2006  (CN) .......................... 2006 1 0171588

(51) Int. Cl.
*G01C 19/72*   (2006.01)
(52) U.S. Cl. ...................................... 356/460
(58) Field of Classification Search .......... 356/459–461, 356/465
See application file for complete search history.

(56) References Cited

U.S. PATENT DOCUMENTS

| | | | | |
|---|---|---|---|---|
| 4,669,814 A | * | 6/1987 | Dyott | 385/42 |
| 5,260,768 A | * | 11/1993 | Cordova et al. | 356/460 |
| 5,949,930 A | * | 9/1999 | Cordova et al. | 385/27 |
| 7,038,783 B2 | * | 5/2006 | Standjord et al. | 356/460 |
| 2005/0008044 A1 | * | 1/2005 | Fermann et al. | 372/19 |

FOREIGN PATENT DOCUMENTS

| | | |
|---|---|---|
| CN | 2682384 | 3/2005 |
| CN | 1892268 | 1/2007 |
| CN | 1936502 | 3/2007 |

* cited by examiner

*Primary Examiner* — Tarifur Chowdhury
*Assistant Examiner* — Jonathon Cook
(74) *Attorney, Agent, or Firm* — Workman Nydegger

(57) ABSTRACT

A fiber optic gyroscope using a low-polarization and polarization-maintaining hybrid light path comprises an optical meter head and a circuit signal processing part, The optical meter head comprises: a light source, a multi-functional integrated optic chip, a detector, a coupler and a fiber coil, wherein the light source is a low polarization light source and single mode fiber pigtail coupling; the input terminal of multi-functional integrated optic chip uses a single mode fiber, and the output terminal of multi-functional integrated optic chip adopts a polarization-maintaining fiber; the input fiber pigtail of the said detector is a single mode fiber; the coupler is a 2×2 polarization independence single mode fiber coupler; the fiber coil is a polarization-maintaining fiber. By adopting the scheme of the low-polarization and polarization-maintaining hybrid light path and the signal processing methods such as all-digital closed loop control and random overmodulation etc., the present invention can reduce the effect of light path polarization crosstalk, simplify the assembling technology, enable large scale production and guarantee the good scale factor linearity performance and the lower noise level. Furthermore, by temperature modeling and compensating, the invention enables the bias of the fiber optic gyroscope to drift more slightly within the all-temperature range, and therefore the fiber optic gyroscope with good performance and engineering application can be achieved.

21 Claims, 2 Drawing Sheets

FIBER OPTIC GYROSCOPE USING A LOW-POLARIZATION AND POLARIZATION-MAINTAINING HYBRID LIGHT PATH

FIELD OF THE INVENTION

The present invention relates to a fiber optic gyroscope, in particular, a fiber optic gyroscope using a low-polarization and polarization-maintaining hybrid light path, which is low cost, anti-jamming and easy to be manufactured in large quantities.

BACKGROUND OF THE INVENTION

Fiber optic gyroscope is an instrument used to measure angular velocity based on Sagnac effect, which is mainly used in inertia measurement systems. Nowadays, the mature and extensively used versions are mainly interferometric digital closed loop fiber optic gyroscopes. The light source is split into two counterpropagating beams of light by a coupler and a multi-functional integrated optic chip. When the sensitive axis direction of the fiber coil has an angular velocity input, Sagnac phase difference is produced between the two beams of light and interference occurs. Then it is transformed into an electronic signal by detector and after processing, the corresponding input angular velocity can be obtained.

Fiber optic gyroscopes have the advantages of small volume, light weight, quickness to startup, high reliability and long-life etc., therefore they are widely used in the systems of navigation, control and so on. Nowadays, the domestic and overseas fiber optic gyroscopes mostly employ a polarization-maintaining fiber coupler as the light source splitter and adopt all-polarization-maintaining scheme in light path, the techniques have been mature and the fiber optic gyroscopes with all-polarization-maintaining scheme have been produced in large quantities in foreign countries. But the all-polarization-maintaining light path scheme has strict requirements of polarization-maintaining property and polarization stability of the light source and the polarization-maintaining fiber coupler and has tendency to be affected by outside environmental factors. In addition, the all-polarization-maintaining scheme has strict requirements of assembling techniques and axis-aligning accuracy, and the cost of the light path is high, which is disadvantageous for manufacture in large quantities. Furthermore, since the domestic manufacture technique for polarization-maintaining fiber couplers is not mature enough, it is necessary to research the fiber optic gyroscope of non-all-polarization-maintaining light path based on single mode optical coupler and try to achieve implementation in engineering and large scale production as soon as possible, so as to meet the requirements of our country for fiber optic gyroscopes in the systems such as navigation and control.

DISCLOSURE OF THE INVENTION

One of the problems that the invention can resolve is: by overcoming the shortcomings of the all-polarization-maintaining light path scheme, provides a fiber optic gyroscope using a low-polarization and polarization-maintaining hybrid light path. It can reduce the effect of the light path polarization crosstalk, decrease the cost of the light path, simplify the assembling technology, improve the production efficiency and the assembling correspondence, and facilitate to manufacture in large quantities.

In addition, another technique of the invention can resolve many problems, i.e., with the help of the circuit signal processing and temperature compensation, all-digital closed loop control is achieved, dynamic range is improved, noise level is reduced and scale factor performance and temperature adaptability of the fiber optic gyroscope are improved.

The technical solution of the invention is: a fiber optic gyroscope using a low-polarization and polarization-maintaining hybrid light path, which comprises an optical meter head and a circuit signal processing part, wherein the optical meter head comprises: a light source, a multi-functional integrated optic chip, a detector, a coupler and a fiber coil. It is characterized in that the said optical meter head uses a low-polarization and polarization-maintaining hybrid light path, i.e., the above mentioned light source is a low polarization light source and single mode fiber pigtail coupling; the input terminal of the said multi-functional integrated optic chip uses a single mode fiber, and the output terminal of the multi-functional integrated optic chip adopts a polarization-maintaining fiber; the input fiber pigtail of the said detector is a single mode fiber; the said coupler is a 2×2 polarization independence single mode fiber coupler; the said fiber coil is a polarization-maintaining fiber.

The said circuit signal processing part uses all-digital closed loop control, and at least comprises a preamplifier, an A/D converter, a FPGA logic circuit, a D/A converter and a modulation driving circuit. After flowing through the detector and preamplifier, the interference signal is transformed into a voltage signal, then it is transformed into a digital signal by the A/D converter and undergoes digital demodulating, digital integrating and digital filtering etc. inside the FPGA logic circuit to produce a ladder-high signal and a digital phase ramp signal. After the digital phase ramp is imposed on the random overmodulation digital signal, it is imposed on the multi-functional integrated optic chip as a feedback signal after flowing through the D/A converter and the modulation driving circuit, then bias modulation is introduced and compensation is done for the Sagnac phase shift due to the input, so that the all-digital closed loop control is accomplished. The ladder-high signal is the closed loop output signal of the fiber optic gyroscope, the output of the fiber optic gyroscope can be obtained by temperature compensated later.

The said bias modulation is random overmodulation, i.e. the modulation waveform is a square wave signal of a pseudo random sequence, whose modulation depth is $2\pi/3$ and frequency is twice as large as the eigenfrequency of the fiber optic coil.

Perform temperature modeling compensation at the closed loop output terminal of the said circuit signal processing part, i.e., place the temperature sensor near the fiber coil, measure the temperature data of the fiber coil and establish the temperature model of the fiber optic gyroscope as following:

$$\Omega = K_0 + K_1 \omega_{in} + \epsilon \qquad (1)$$

$$K_0(T) = K_{00} + K_{01}T + K_{02}\Delta T \qquad (2)$$

$$K_1(T) = K_{10} + K_{11}T + K_{12}\Delta T \qquad (3)$$

wherein $\Omega$ is output of the fiber optic gyroscope, $\omega_{in}$ is angular velocity of the input, $\epsilon$ is random drift, T is temperature, $\Delta T$ is temperature gradient, $K_i$ and $K_{ij}$ are error coefficient.

The principle of the invention: by deeply research the mechanism of the hybrid light path polarization property influencing the fiber optic gyroscope performance, according to all-polarization-maintaining light path, the expression of the polarization error can be described:

$$\phi_e = \sqrt{\frac{1-d}{1+d}}\,\varepsilon\sqrt{hl}$$

wherein d represents the degree of polarization of the light source, $\varepsilon$ represents the polarization suppression ratio of the multi-functional integrated optic chip, h represents the polarization maintaining parameter of the fiber, l represents the fiber length of the fiber coil, the product of h and l represents the statistical effect of polarization cross-coupling inside the coil.

The above formula needs the support of the polarization-maintaining coupler and can not adapt to the case of single mode coupler. The phase error $\phi_e$ of the fiber optic gyroscope caused by the polarization property of the hybrid light path with the single mode coupler can be shown as following:

$$\phi_e = \varepsilon\sqrt{2\rho_1\rho_2}$$

wherein $\rho_1$ represents the ratio of the light wave amplitude on the multi-functional integrated optic chip suppression axis to that on the input axis, the said light wave is emitted by the light source, travels through the single mode coupler and then is coupled in the multi-functional integrated optic chip. The maximum value of $\rho_1$ represents the ratio of the light wave amplitude in the maximum intensity direction to that in the minimum intensity direction before the light wave is coupled in the multi-functional integrated optic chip, which is denoted as $(1+d_1)/(1-d_1)$, wherein $d_1$ is the degree of polarization of the light wave inputted to the multi-functional integrated optic chip. The minimum value of $\rho_1$ is denoted as $(1-d_1)/(1+d_1)$, $\rho_2=hl$. It can be seen from the above formula that, in order to reduce the polarization error, the degree of polarization of the light source may be improved, the polarization-maintaining fiber coupler with high extinction ratio may also be used and it may be ensured that the input axes of the fiber pigtails of the light source, the coupler and the multi-functional integrated optic chip should be aligned. But the cost of the polarization-maintaining coupler is relatively high, which is 40 times more expensive than that of the single mode coupler. When SLD light source with high degree of polarization is used together with 2×2 polarization independence single mode fiber coupler, the emission of the light source can not be aligned well with the input port of the multi-functional integrated optic chip, if the degree of polarization of the light source is 0.8, the variation range of $\rho_1$ can reach 81 and the maximum value of the phase error is 9 times of the ideal value. In order to solve this problem with low cost, the present invention uses low polarization light source and 2×2 polarization independence single mode fiber coupler, whose parameter $\rho_1$ is near to 1. As long as the polarization suppression ratio $\varepsilon$ is low enough, the phase error caused by polarization can be small enough and stable. For example, the degree of polarization $d_1$ of the light wave inputted to the multi-functional integrated optic chip is 0.06, it can be calculated that the variation range of the parameter $\rho_1$ is 1.13 and the variation of the phase error is only 1.06. Actually, $\varepsilon$ can reach $10^{-6}$, if the light source with the degree of polarization d of 0.8 is used together with the single mode coupler, $\rho_1=0.11\sim9$, if $h=10^{-6}$, $L=1000$ m, the maximum phase error go $\phi_e=9\times10^{-7}$ rad; if the degree of polarization d of the light source is reduced to 0.05, $d_1$ is 0.06 and other parameters are unvaried, $\rho_1=0.89\sim1.13$, the maximum phase error can be as low as $1.06\times10^{-7}$ rad, reduced by 88.2%. Therefore, by use of the non-all-polarization-maintaining light path based on 2×2 polarization independence single mode fiber coupler and low-polarization light source, the small phase error also can be obtained, moreover, the phase error variation will be small, which satisfies the requirement of the fiber optic gyroscopes with various accuracy. This shows that using low-polarization light source and polarization independence coupler can reduce the polarization error effectively.

If the single mode coupler is not polarization independent, the coupler can perform the polarizing function, even the light travelling through the coupler is the non-polarized light, the degree of polarization of the light wave also can be increased to a large value. In worse case, it can be increased to 0.6 and will cause the phase error as large as $2\times10^{-7}$ rad, which is unacceptable for the fiber optic gyroscope with higher accuracy. So in the present invention the use of polarization independence coupler can ensure that the polarization variation of the light wave inputted to the multi-functional integrated optic chip would be minimum, so as to ensure that the polarization error would be stabilized as a relatively small value.

The advantages of the invention over the prior arts are:

(1) In the invention, the front light path uses a non-polarization light path, i.e., the light source uses a low polarization light source, and the detector, the input terminal of the multi-functional integrated optic chip and the coupler all use single mode fibers, this can reduce the requirements for polarization-maintaining property and polarization stability of the latter optical elements, and reduce the effect of the light path polarization crosstalk in large degree, improve the performance of anti-temperature variation and mechanics interference of the fiber optic gyroscope; while the front light path in the prior arts is a polarization-maintaining light path and a high polarization light source (degree of polarization $\geq 90\%$) is used, so that it requires strictly for polarization-maintaining property and polarization stability of the latter optical elements, and it is easy to induce the polarization crosstalk of the light path.

(2) A 2×2 polarization independence single mode fiber coupler is used, so the polarization crosstalk is reduced.

(3) Since the fiber pigtail of the front light path elements uses the single mode fiber and uses the low-cost single mode fiber coupler, the cost of the light path is lowered.

(4) Aligning axes is not required when splicing the multi-functional integrated optic chip front light path, so the hardware cost is lowered and the production efficiency and assembling consistency are improved, which is suitable for large scale production; The fiber core of the polarization-maintaining fiber requires to be axis-aligned accurately before splicing, which will result in lower production efficiency and poorer assembling consistency.

(5) All-digital closed loop control is used, so the dynamic range is improved and the requirement for performance of the electronic elements is reduced.

(6) Overmodulation is used, so higher signal-to-noise ratio can been obtained, furthermore, with the help of random modulation, the dead zone due to fixed modulation waveform can be avoided, and the scale factor linearity can be improved.

(7) By establishing the temperature model of fiber optic gyroscope and performing compensation algorithm in DSP, the zero-position dither of the fiber optic gyroscope within the all-temperature range can be reduced, and the temperature adaptability of the fiber optic gyroscope can be improved.

In the figures: 101. Light source, 102. Detector. 103. Coupler, 104. Multi-functional integrated optic chip, 105. Fiber coil, 106. Fiber splice point, 107. Fiber splice point, 108. Fiber splice point, 109. Fiber splice point, 110. Fiber splice point, 111. Free-end of the coupler, 112. Preamplifier, 113. A/D converter, 114. FPGA logic circuit, 115. D/A converter, 116. Temperature sensor, 117. Modulation driving circuit, 118. Light source driving circuit, 119. DSP chip.

PREFERRED EMBODIMENTS OF THE INVENTION

Figure 1:
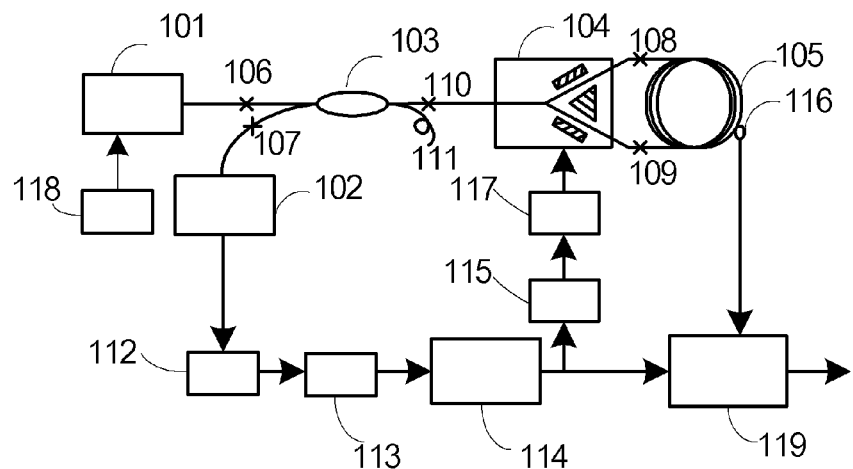
FIG. 1 is the diagrammatic drawing of the structure of the invention.

As shown in FIG. 1, the light path embodiment of the invention comprises a light source 101, a detector 102, a coupler 103, a multi-functional integrated optic chip 104 and a fiber coil 105.

The light source 101 is preferably a low polarization light source with the wavelength of 1310 nm and the degree of polarization ≦5%, which is coupled with a single mode fiber pigtail with the mode field diameter of 6.5±0.5 μm and the cladding diameter of 125 μm. By using the above light source to reduce light path loss, the signal-to-noise ratio can be improved. Indeed, the light source 101 also can be a low-polarization light source with the wavelength of 850 nm; if the requirement for the accuracy of the fiber optic gyroscope is not high, the light source with another degree of polarization also can be used, such as the light source with the degree of polarization of 6-10%. The manufacture process of the low polarization light source is mainly based on the energy band theory of semiconductor, the rib waveguide structure is used in technology, combined with the absorption region manufacture technology and the technology of plating high-anti-reflecting film on the cavity surface, so as to enable the light source core's extinction ratio index to meet the low polarization requirement.

The input fiber pigtail of the detector 102 is a single mode fiber, which requires the return loss index to be ≧40 dB. In the existing all-polarization-maintaining light path schemes, the fiber pigtail of the detector uses polarization-maintaining fiber. In the present invention, it is hybrid polarization light path and uses single mode fiber coupler, the detector also uses single mode fiber coupled, so the influence of polarization to detecting the light signal would not be taken account, and the cost can be reduced by using the single mode fiber. The return loss index is required to be ≧40 dB, because that the light signal reflected from the detector to the fiber coil is a noise signal and it will influence the performance of the fiber optic gyroscope directly. So, when the detector in the invention is performing fiber end-coupling, the end of the fiber should be tilted 10 degree processed, so as to enable the return loss index to satisfy the requirement. While the end of the fiber coupled with the detector applied to optical communication now has not been processed, whose return loss index is lower than 30 dB, 20~30 dB normally, it is not suitable to be used in the present invention.

The coupler 103 is a 2×2 polarization independence single mode fiber coupler, which requires the polarization dependence loss (PDL) to be ≦0.03 dB, the fiber mode field diameter to be 6.5±0.5 μm and the cladding diameter to be 125 μm, the above indexes is mainly used to ensure the match of the whole light path mode field. Single mode fiber couplers can be classified as two kinds: polarization independence and polarization dependence. The polarization dependence loss PDL of the polarization dependence single mode fiber coupler ≧0.1 dB, even more than 0.15 dB, so it cannot be used in the invention. The mode field diameter of the single mode fiber used by the normal single mode coupler is 9~10.5 μm, it cannot be used in the low-polarization and polarization-maintaining hybrid light path. The 2×2 polarization independence single mode coupler can be bought in market, also can be manufactured using the following techniques: using parallel or kinked sintering elongated tapering technology, i.e., during the process of fiber fused biconical taper, set the control point of annealed splitting ratio (30:70), monitor whether the control point is reached, at the same time when the heating torch is annealed, the fiber clamp on the end of the coupler's fused biconical taper zone is rotated by 90 degree, by controlling the angle of rotating fiber, the polarization independence single mode coupler can be manufactured. The apparatus performing the above techniques can be the fiber fused biconical taper system of Anteced Company in Taiwan. The input terminal of the multi-functional integrated optic chip 104 uses the single mode fiber with the mode field diameter of 6.5±0.5 μm and the cladding diameter of 125 μm, the fiber of the output terminal uses the elliptical polarization-maintaining fiber with thin diameter of 80 μm. The principle is: (1) using this kind of single mode fiber, the mode field diameter is matched with the waveguide chip mode field, this is advantageous for fiber coupling, the use of thin diameter fiber by the output terminal is mainly for ensuring that the size of the fiber would be consistent with the fiber coil, this is advantageous for splicing assembly and the splicing quality and efficiency can be improved; (2) since the front light path is single mode fiber, using single mode fiber as the multi-functional integrated optic chip can decrease the cost in a certain extent and reduce the workload of azimuthal alignment by ⅓ when the multi-functional integrated optic chip means coupling fiber pigtail. While in the normal prior art, the fiber pigtails of the multi-functional integrated optic chip means input and output terminal are both 125 μm polarization-maintaining fiber.

The fiber coil 105 is the elliptical polarization-maintaining fiber with thin diameter of 80 μm. Through experiments, the above index can reduce the volume of the fiber coil and improve anti-bending performance and life of the fiber coil.

All of the single mode fiber pigtails in the invention have the fiber pigtail lengths to be limited as ≦0.30 m during the light path manufacture, this can reduce the effect of the outside environment factor to the stress of the single mode fiber, thereby reduce the polarization instability factor, for the fiber is longer, it is easier to be interfered.

The light source 101 is connected to the coupler 103 by the splice point 106; the detector 102 is connected to the coupler 103 by the splice point 107; the coupler 103 is connected to the multi-functional integrated optic chip 104 by the splice point 110; the multi-functional integrated optic chip 104 is connected to the fiber coil 105 by the splice point 108 and 109, respectively. During the assembling process, control the single fiber pigtails lengths of the light source 101, the detector 102, the coupler 103 and the multi-functional integrated optic chip 104 to be ≦0.30 m. After the light source 101 and the input terminal of the coupler 103 are connected together, detect the degree of polarization of the output light signal at the output free-end 111 of the coupler 103, requiring the degree of polarization(DOP) to be ≦6%. Crush the free-end 111 of the coupler 103, wind the fiber into two circles with the diameter of 10 mm, and fix the fiber by the hardening adhesive. The degree of polarization DOP of the coupler with end freely ≦6%, this is mainly because that the residual polarization and the light path assembly techniques of the single mode fiber coupler cause the degree of polarization of the light signal inputted to the multi-functional integrated optic chip to increase. By monitoring the degree of polarization of the light signal of the coupler's free-end, with which the degree of polarization of the light signal inputted to the multi-functional integrated optic chip can be compared. If the index of degree of polarization is too large, it can influence the light path noise and reduce the performance of the gyroscope. Therefore, it is suitable for degree of polarization to be controlled $\leq 6\%$.

The light source driving circuit 118 in FIG. 1 requires that the light source core's temperature variation should be controlled no more than 0.1⌊ and the light power variation of the light source should be controlled no more than 3%.

The digital closed loop control part of the invention at least comprises a preamplifier 112, an A/D converter 113, a FPGA logic circuit 114, a D/A converter 115 and a modulation driving circuit 117. After travelling through the detector 102 and preamplifier 112, the interference signal is transformed into a voltage signal. Then it is transformed into a digital signal by the A/D converter 113. The closed loop output of the gyroscope is obtained after performing digital demodulating, digital integrating and digital filtering inside the FPGA logic circuit, then it is outputted by temperature compensated in DSP chip 119; on the other hand, integrates the closed loop output of the gyroscope further to produce a digital phase ramp signal. After the digital phase ramp signal is imposed on the random overmodulation digital signal, it is imposed on the multi-functional integrated optic chip 104 as a feedback signal after flowing through the D/A converter 115 and the modulation driving circuit 117. Then bias modulation is introduced and compensation is done for the Sagnac phase shift due to the input, so that the all-digital closed loop control is accomplished.

Figure 5:
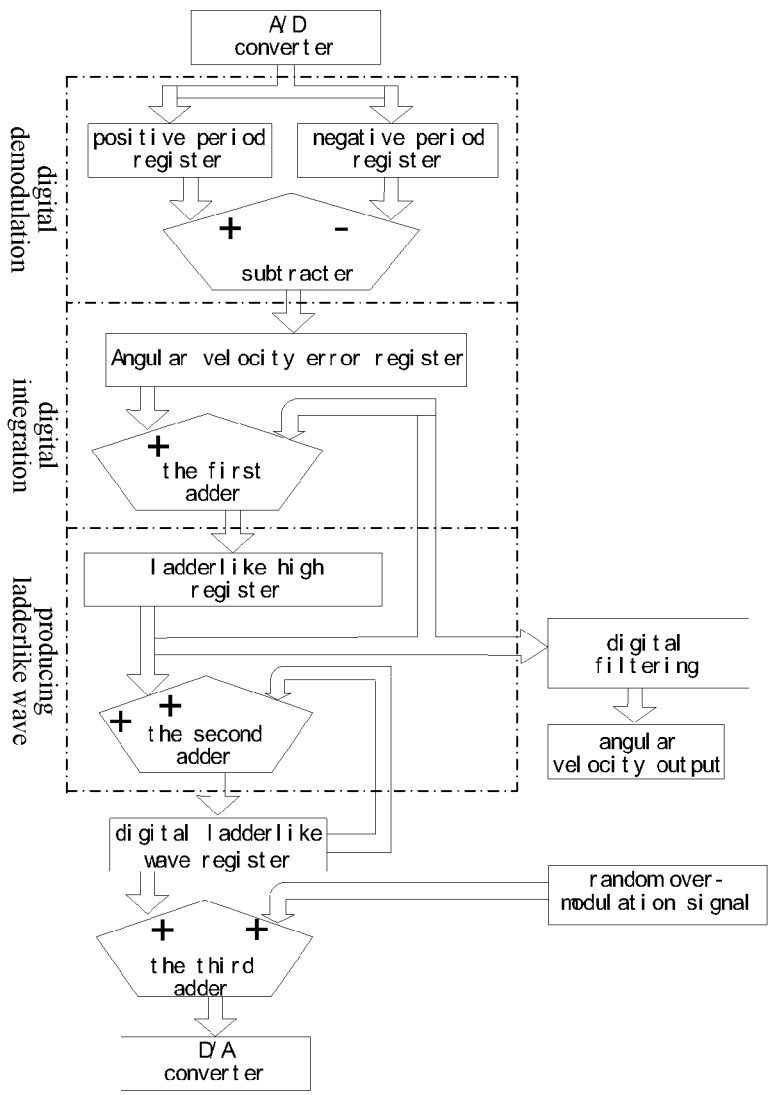
FIG. 5 is the implementation block diagram of the FPGA logic circuit in FIG. 1.

As shown in FIG. 5, the operation process of FPGA logic circuit: store the digital values transformed by the A/D converter 113 in a positive period register and a negative period register respectively, then the digital values in the negative period register is subtracted from that in the positive period register by a subtracter, the digital demodulation is achieved, and the digital closed loop angular velocity error signal is obtained, store this signal in the angular velocity error register, then this signal is added to the data in the ladder-high register by the first adder and digital integrating, the integration result is stored in the ladder-high register, the data in the ladder-high register is given to DSP chip 119 to do temperature compensation after digital filtering, finally the gyroscope output signal which can satisfy the practical requirement is obtained; on the other hand, the data in the ladder-high register is added to the data in the digital phase ramp register as ladder-high of the phase ramp by the second adder and digital integrating again, so the digital phase ramp signal is produced. Then the phase ramp signal and the random overmodulation digital signal are added by the third adder, the resulting digital signal is send to the D/A converter 115.

Figure 2:
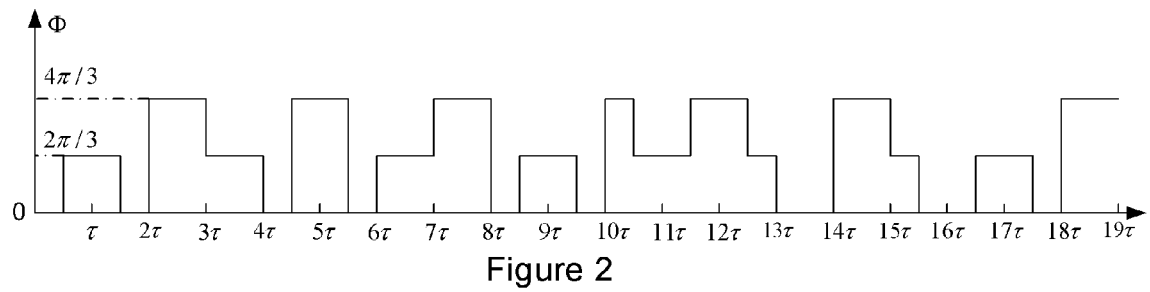
FIG. 2 is the diagrammatic drawing of the random overmodulation waveform used by the invention.

FIG. 2 shows the random overmodulation waveform of the invention, the modulation depth is $2\pi/3$, and it is a pseudo random sequence whose frequency is twice as large as the eigenfrequency of the fiber coil. With the help of random modulation, the dead zone due to fixed modulation waveform can be avoided. Furthermore, since the modulation depth is $2\pi/3$, the higher signal-to-noise ratio can be obtained. The digital values corresponding to this waveform is produced in the FPGA logic circuit 114, then it is imposed on the digital values of the feedback phase ramp, and it is imposed to the multi-functional integrated optic chip 104 as modulation signal after flowing through the D/A converter 115 and the modulation driving circuit 117, so the random overmodulation is accomplished.

The temperature modeling method of the invention is as following: more than four temperature sensors 116 can be placed inside and outside the fiber coil 105 respectively. The temperature data of the fiber coil 105 and the temperature gradient data are measured. The established temperature model of the fiber optic gyroscope is:

$$\Omega = K_0 + K_1 \omega_{in} + \epsilon \quad (1)$$

$$K_0(T) = K_{00} + K_{01}T + K_{02}\lfloor T \quad (2)$$

$$K_1(T) = K_{10} + K_{11}T + K_{12}\lfloor T \quad (3)$$

wherein $\Omega$ is output of the fiber optic gyroscope, $\omega_{in}$ is input angular velocity, $\epsilon$ is random drift, T is temperature, $\lfloor T$ is temperature gradient, $K_i$ and $K_{ij}$ are error coefficient.

When the temperature gradient $\lfloor T$ is zero, different temperature points $T_i$ are selected within all-temperature range. At each temperature point $T_1$, perform velocity scaling test for fiber optic gyroscope with one-axis velocity wheeling table, for the different velocity input $\omega_i$, the different gyroscope outputs $\Omega_i$ are obtained, perform least squares fitting for the input and output data of gyroscope, and the coefficient $K_0(T_i)$ and $K_1(T_i)$ in equation (1) are obtained. Using each temperature point $T_i$ and different temperature gradient $\lfloor T$, and $K_0(T_i)$, perform least squares fitting for equation (2), and the parameters $K_{00}$, $K_{01}$ and $K_{02}$ are obtained. Using each temperature point Ti and different temperature gradient $\lfloor T_1$ and $K_1(T_1)$, perform least squares fitting for equation (3), and the parameters $K_{10}$, $K_{11}$ and $K_{12}$ are obtained.

Establish the above 3 models, the compensation for temperature error is performed in DSP chip 119.

Figure 3:
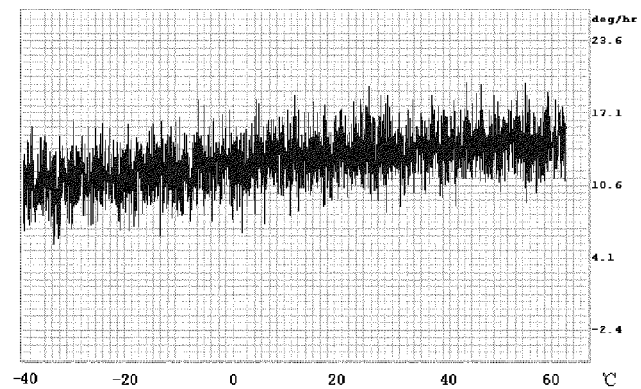
FIG. 3 is the diagrammatic drawing of the output of the fiber optic gyroscope before it is temperature compensated.
Figure 4:
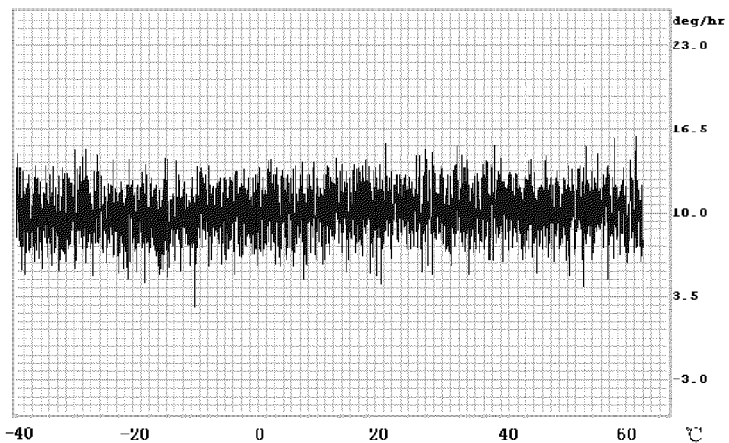
FIG. 4 is the diagrammatic drawing of the output of the fiber optic gyroscope after it is temperature compensated.

The output curves of the gyroscope before and after compensation are shown in FIG. 3 and FIG. 4 respectively. It can be found by comparison that after the temperature compensation, the bias drift of the fiber optic gyroscope within all-temperature range can be improved remarkably, and the temperature adaptability of the fiber optic gyroscope can be improved. While in the prior art, the normal temperature model of the fiber optic gyroscope is:

$$\Omega = K_0 + K_1 \omega_{in} + \epsilon \quad (4)$$

$$K_0(T) = K_{00} + K_{01}T \quad (5)$$

$$K_1(T) = K_{10} + K_{11}T \quad (6)$$

wherein $\Omega$ is output of the fiber optic gyroscope, $\omega_{in}$ is input angular velocity, $\epsilon$ is random drift, T is temperature, $K_i$ and $K_{ij}$ are error coefficient.

Temperature gradient $\lfloor T$ is not included in the above temperature model. Because the fiber optic gyroscope is sensitive to temperature gradient, if only compensating for the effect of the temperature's absolute value, it will cause that in the different temperature gradient, the bias fluctuation of the gyroscope will still occur, therefore the improvement of the temperature performance of the gyroscope can not be evident. But if performing temperature compensation for temperature gradient, the bias drift of the fiber optic gyroscope within all temperature range can be reduced, and the temperature adaptability of the fiber optic gyroscope can be improved.

The invention claimed is:

1. A fiber optic gyroscope using a low-polarization and polarization-maintaining hybrid light path, the fiber optic gyroscope comprises:
an optical meter head and a circuit signal processing part, wherein the optical meter head comprises:

a light source, a multi-functional integrated optic chip, a detector, a coupler and a fiber coil, wherein:

said optical meter head uses a low-polarization and polarization-maintaining hybrid light path, which said light source is a low polarization light source and single mode fiber pigtail coupling;

an input terminal of said multi-functional integrated optic chip uses a single mode fiber, and an output terminal of the multi-functional integrated optic chip adopts a polarization-maintaining fiber;

an input fiber pigtail of said detector is a single mode fiber;

said coupler is a 2×2 polarization independence single mode fiber coupler;

said fiber coil is a polarization-maintaining fiber.

2. The fiber optic gyroscope using a low-polarization and polarization-maintaining hybrid light path according to claim 1, characterized in that: a wavelength of said low polarization light source is 1310 nm, a degree of polarization of said low polarization light source is ≦5%, an output coupling of said low polarization light source uses a single mode fiber pigtail with a mode field diameter of 6~7 μm and a cladding diameter of 125 μm.

3. The fiber optic gyroscope using a low-polarization and polarization-maintaining hybrid light path according to claim 2, characterized in that: during the light path assembling of said low-polarization and polarization-maintaining hybrid light path, a length of the single mode fiber pigtails is limited to ≦0.30 m.

4. The fiber optic gyroscope using a low-polarization and polarization-maintaining hybrid light path according to claim 2, characterized in that: following the connection of said light source with an input terminal of the 2×2 polarization independence single mode fiber coupler, and detecting the degree of polarization of the output light signal at the free-end of the output terminal of the 2×2 polarization independence single mode fiber coupler, the degree of polarization (DOP) is ≦6%.

5. The fiber optic gyroscope using a low-polarization and polarization-maintaining hybrid light path according to claim 1, characterized in that: said single mode fiber used by the input terminal of the multi-functional integrated optic chip is the single mode fiber with a mode field diameter of 6~7 μm and a cladding diameter of 125 μm, wherein the polarization-maintaining fiber adopted by the output terminal of said multi-functional integrated optic chip is an elliptical polarization-maintaining fiber with a thin diameter of 80 μm.

6. The fiber optic gyroscope using a low-polarization and polarization-maintaining hybrid light path according to claim 5, characterized in that: during the light path assembling of said low-polarization and polarization-maintaining hybrid light path, a length the single mode fiber pigtails is limited to ≦0.30 m.

7. The fiber optic gyroscope using a low-polarization and polarization-maintaining hybrid light path according to claim 1, characterized in that: the said input fiber pigtail of the detector is a single mode fiber, and a return loss index requirement of said detector is ≧40 dB.

8. The fiber optic gyroscope using a low-polarization and polarization-maintaining hybrid light path according to claim 7, characterized in that: during the light path assembling of said low-polarization and polarization-maintaining hybrid light path, a length of the single mode fiber pigtails is limited to ≦0.30 m.

9. The fiber optic gyroscope using a low-polarization and polarization-maintaining hybrid light path according to claim 1, characterized in that: a polarization dependence loss (PDL) of the said 2×2 polarization independence single mode fiber coupler is ≦0.03 dB, a fiber mode field diameter of said 2×2 polarization independence single mode fiber coupler is 6~7 μm, and a fiber cladding diameter of said 2×2 polarization independence single mode fiber coupler is 125 μm.

10. The fiber optic gyroscope using a low-polarization and polarization-maintaining hybrid light path according to claim 9, characterized in that: during the light path assembling of said low-polarization and polarization-maintaining hybrid light path, a length of the single mode fiber pigtails is limited to ≦0.30 m.

11. The fiber optic gyroscope using a low-polarization and polarization-maintaining hybrid light path according to claim 9, characterized in that: following the connection of the said light source with an input terminal of the 2×2 polarization independence single mode fiber coupler, and detecting a degree of polarization of an output light signal at a free-end of an output terminal of the 2×2 polarization independence single mode fiber coupler, a degree of polarization (DOP) is ≦6%.

12. The fiber optic gyroscope using a low-polarization and polarization-maintaining hybrid light path according to claim 9, characterized in that: a free-end processing method of said 2×2 polarization independence single mode fiber coupler is to crush a free-end of an output terminal of said 2×2 polarization independence single mode fiber coupler, wind the free-end into two circles with a diameter of 10 mm, and fix the fiber by a hardening adhesive.

13. The fiber optic gyroscope using a low-polarization and polarization-maintaining hybrid light path according to claim 1, characterized in that: the said fiber coil is an elliptical polarization-maintaining fiber with a thin diameter of 80 μm.

14. The fiber optic gyroscope using a low-polarization and polarization-maintaining hybrid light path according to claim 13, characterized in that: during the light path assembling of said low-polarization and polarization-maintaining hybrid light path, a length of the single mode fiber pigtails is limited to ≦0.30 m.

15. The fiber optic gyroscope using a low-polarization and polarization-maintaining hybrid light path according to claim 1, characterized in that: during the light path assembling of said low-polarization and polarization-maintaining hybrid light path, a length of the single mode fiber pigtails is limited to ≦0.30 m.

16. The fiber optic gyroscope using a low-polarization and polarization-maintaining hybrid light path according to claim 1, characterized in that: following the connection of the said light source with an input terminal of the 2×2 polarization independence single mode fiber coupler, and detecting a degree of polarization (DOP) of an output light signal at a free-end of the output terminal of the 2×2 polarization independence single mode fiber coupler, the degree of polarization is ≦6%.

17. The fiber optic gyroscope using a low-polarization and polarization-maintaining hybrid light path according to claim 1, characterized in that: a free-end processing method of said 2×2 polarization independence single mode fiber coupler is to crush a free-end of the output terminal of said 2×2 polarization independence single mode fiber coupler, wind the free-end into two circles with the diameter of 10 mm, and fix the fiber by a hardening adhesive.

18. The fiber optic gyroscope using a low-polarization and polarization-maintaining hybrid light path according to claim 1, characterized in that: said circuit signal processing part at least comprises a preamplifier, an A/D converter, an FPGA (Field-Programmable Gate Array) logic circuit, a D/A converter and a modulation driving circuit, after flowing through the detector and preamplifier, the interference signal is transformed into a voltage signal, then the voltage signal is transformed into a digital signal by the A/D converter and undergoes digital demodulating, digital integrating and digital filtering inside the FPGA logic circuit to obtain the gyroscope output; wherein the FPGA logic circuit integrates the gyroscope output to produce a digital phase ramp, after the digital phase ramp is imposed on the random overmodulation digital signal, the digital phase ramp is imposed on the multi-functional integrated optic chip as a feedback signal after flowing through the D/A converter and the modulation driving circuit, then bias modulation is introduced and compensation is done for the Sagnac phase shift due to the input.

19. The fiber optic gyroscope using a low-polarization and polarization-maintaining hybrid light path according to claim 18, characterized in that: said bias modulation is random overmodulation or a modulation waveform is a square wave signal of a pseudo random sequence, whose modulation depth is $2\pi/3$ and frequency is twice as large as an eigenfrequency of the fiber coil.

20. The fiber optic gyroscope using a low-polarization and polarization-maintaining hybrid light path according to claim 18, characterized in that: temperature modeling compensation is performed for data which is at a closed-loop output of said fiber optic gyroscope and has undergone digital filtering, a temperature sensor is placed near the fiber coil, temperature data of the fiber coil is measured, and a temperature model of the fiber optic gyroscope is established as following:

$$\Omega = K_0 + K_1 \omega_{in} + \epsilon \quad (1)$$

$$K_0(T) = K_{00} + K_{01}T + K_{02}\Delta T \quad (2)$$

$$K_1(T) = K_{10} + K_{11}T + K_{12}\Delta T \quad (3)$$

wherein $\Omega$ is output of the fiber optic gyroscope, $\omega_{in}$ is input angular velocity, $\epsilon$ is random drift, $T$ is temperature, $\Delta T$ is temperature gradient, $K_i$ and $K_{ij}$ are error coefficient.

21. The fiber optic gyroscope using a low-polarization and polarization-maintaining hybrid light path according to claim 1, characterized in that: temperature modeling compensation is performed for the data which is at a closed-loop output of the fiber optic gyroscope and has undergone digital filtering, a temperature sensor is placed near the fiber coil, temperature data of the fiber coil is measured, and a temperature model of the fiber optic gyroscope is established as following:

$$\Omega = K_0 + K_1 \omega_{in} + \epsilon \quad (1)$$

$$K_0(T) = K_{00} + K_{01}T + K_{02}\Delta T \quad (2)$$

$$K_1(T) = K_{10} + K_{11}T + K_{12}\Delta T \quad (3)$$

wherein $\Omega$ is output of the fiber optic gyroscope, $\omega_{in}$ is input angular velocity, $\epsilon$ is random drift, $T$ is temperature, $\Delta T$ is temperature gradient, $K_i$ and $K_{ij}$ are error coefficient.

* * * * *